United States Patent

[11] 3,576,464

[72] Inventor Wilhelmus Theodorus Hendrikus Hetterscheid
Nijmegen, Netherlands

[21] Appl. No. 805,331
[22] Filed Mar. 7, 1969
[45] Patented Apr. 27, 1971
[73] Assignee U. S. Philips Corporation
New York, N.Y.
[32] Priority Mar. 30, 1968
[33] Netherlands
[31] 6804513

[54] CIRCUIT ARRANGEMENT FOR GENERATING A SAWTOOTH CURRENT

7 Claims, 6 Drawing Figs.

[52] U.S. Cl. .......... 315/27
[51] Int. Cl. .......... H01j 29/76
[50] Field of Search .......... 315/27 (TD), 27

[56] References Cited

OTHER REFERENCES

TOWERS TRANSISTOR TELEVISION RECEIVERS, 1963, p. 134

*Primary Examiner*—Rodney D. Bennett, Jr.
*Assistant Examiner*—Joseph G. Baxter
*Attorney*—Frank R. Trifari

ABSTRACT: A horizontal deflection circuit in which the driver transistor is coupled to the output transistor via a transformer. In order to prevent oscillations in the output stage, a capacitor is shunted across the transformer secondary winding. The capacitor is chosen so that its impedance, at the line repetition frequency, is substantially smaller than the impedance of the secondary inductance, e.g., 3 to 5 times smaller.

INVENTOR.
WILHELMUS T.H.H. HETTERSCHEID
BY
Frank R. Trifari
AGENT

Patented April 27, 1971 3,576,464

2 Sheets-Sheet 2

INVENTOR.
WILHELMUS T.H.H. HETTERSCHEID

BY

Frank R. Trifari

AGENT

CIRCUIT ARRANGEMENT FOR GENERATING A SAWTOOTH CURRENT

The present invention relates to a circuit arrangement for generating a sawtooth current through the horizontal deflection coil of a display tube. More particularly, to a deflection circuit provided with a final transistor whose output circuit includes the deflection coil and which is coupled to a driver transistor through a transformer. The secondary of the transformer is connected between base and emitter of the final transistor. A switching signal is applied to the base of the driver transistor which blocks and releases the final transistor through the transformer, the blocking period lasting longer than the flyback time of the sawtooth current. The final transistor is essentially an asymmetrical transistor so that at the beginning of the scan time the current through the deflection coil which is then reversed relative to the end of the scan time, can flow through the released base-collector diode of the final transistor. The supply voltage of the final transistor is many times higher, for example, at least 10 times higher than the peak-to-peak value of the switching signal applied through the transformer between base and emitter of the final transistor.

Such a circuit arrangement has been described in a copending application Ser. No. 579,539, filed Sept. 15, 1966, now U.S. Pat. No. 3,504,224.

This circuit arrangement operates perfectly under normal circumstances. It has, however, been found that the final transistor also becomes defective if the driver transistor becomes defective (can no longer conduct) or if a defect occurs in the control circuit of this driver transistor so that it can no longer be rendered conductive at the desired instants. Thus the drawback is that not only elements in the control circuit of the final transistor become defective, but that the final transistor itself becomes defective too. If the defect of the final transistor is found first during repair and if only this transistor is replaced, it may happen that the new final transistor may again become defective when power is applied to the circuit.

In order to obviate these drawbacks the circuit arrangement according to the invention is characterized in that the secondary of the transformer is shunted by a capacitor whose impedance at the repetition frequency of the sawtooth current is smaller than the impedance of the secondary inductance of the driver transformer.

As will be described hereinafter, the step according to the invention is based on the concept that due to energy being returned from the collector circuit to the base circuit through the base-collector diode of the final transistor, there is the possibility that the final transistor starts oscillating of its own accord if the driver transistor does not become conductive at the desired instants. In the event of self-oscillation, the control energy in the base circuit of the final transistor is in the end no longer able to maintain this final transistor in the saturated state so that the natural dissipation of this final transistor will be larger than under normal operating conditions. Furthermore, switching off is then effected much less abruptly, that is to say, the collector current turns to zero much more slowly than when the driver transistor becomes conductive. As a result the product of current and voltage during this gradual switching off will be much higher than when the collector current quickly returns to zero. Especially the latter effect causes very high dissipations.

This means that the normal on-off conditions are no longer satisfied during this self-oscillation, and since self-oscillation may continue through a few periods the overall dissipation of the final transistor becomes much higher than it can stand so that this final transistor is seriously damaged or even destroyed. Due to the step according to the invention, in which a capacitor is additionally connected on the secondary side, the possibility of self-oscillation is avoided and hence the final transistor is prevented from becoming defective if the control circuit becomes defective.

In order that the invention may be readily carried into effect, a few embodiments thereof will now be described in detail, by way of example, with reference to the accompanying diagrammatic drawings, in which:

FIG. 1 shows the known circuit arrangement according to the copending U.S. Pat. application Ser. No. 579,539;

Figure 4A:
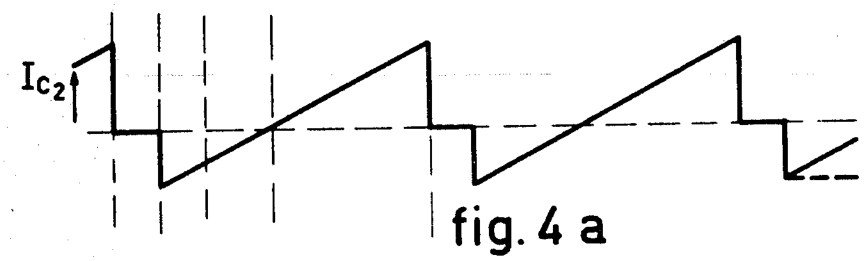
Figure 4B:
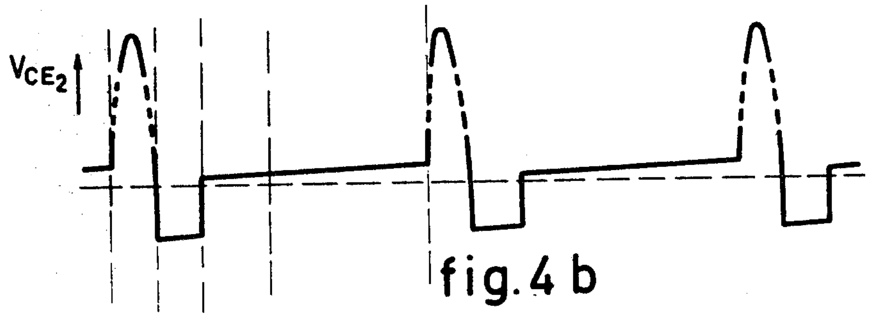
Figure 4C:
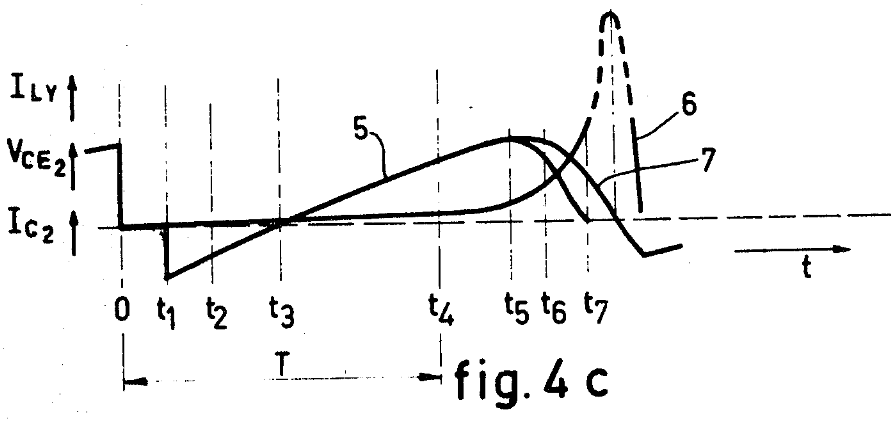

FIGS. 4*a*—*c* show the collector current and collector voltage of the final transistor both in normal use and when the driver transistor does not become conductive unless the step according to the invention is taken.

Figure 1:
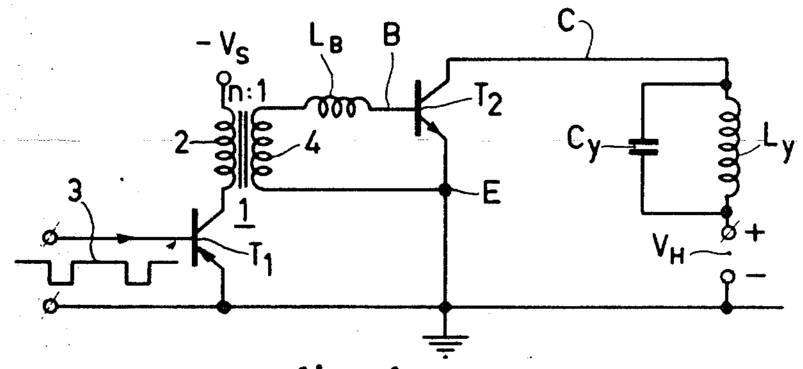

Except for the series inductance $L_B$, the operation of the circuit arrangement of FIG. 1 has been described in the aforesaid copending U.S. Pat. application so that it is sufficient to mention herein the switching elements used.

The circuit arrangement of FIG. 1 consists of driver transformer 1 having a primary 2 which is connected in the collector circuit of a driver transistor $T_1$ to whose base circuit the control signal 3 is applied. The secondary 4 of the transformer 1 is connected between base B and emitter E of the final transistor $T_2$. The collector circuit of $T_2$ includes the parallel arrangement of a deflection coil $L_y$ and a capacitor $C_y$ connected parallel thereto and which circuit is supplied from a voltage source $V_H$.

The operation of the series inductance $L_B$ has been described in my copending U.S. Pat. application Ser. No 737,009, filed June 14, 1968 and this inductance $L_B$ is provided to ensure that the collector current of the final transistor $T_2$ returns as quickly as possible from a given final value to zero at the end of the scan time of the sawtooth current flowing through the coil $L_Y$.

Figure 2:
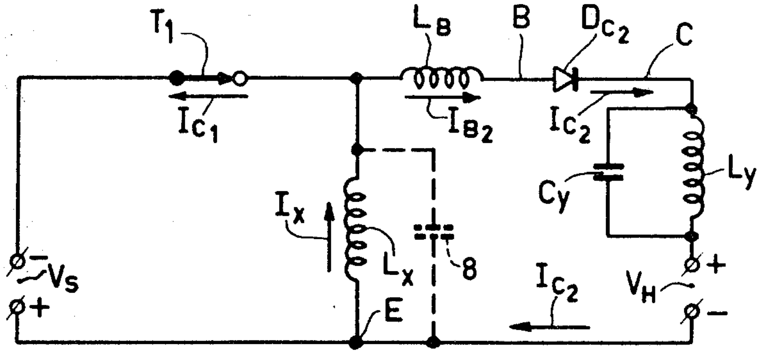
FIG. 2 is a partial substitution diagram of the circuit arrangement of FIG. 1.

FIG 2 shows that partial substitution diagram of the circuit arrangement of FIG. 1. The last-mentioned FIG. shows that a current $I_{c1}$ flows which accumulates electromagnetic energy in the coupling inductance $L_x$ when the driver transistor $T_1$ functions at instants when it is conducting (switch $T_1$ shown in FIG. 2 closed). The current $I_{c1}$ flows in the primary circuit of the transformer 1 and will therefore be referred to hereinafter as "primarily supplied energy."

FIG. 2 also shows that a current $I_{c2}$=$I_{B2}$ flows in the secondary circuit which likewise accumulates energy in the coupling inductance $L_x$. The last-mentioned energy will be referred to as "secondarily supplied energy." In practice, the "primary energy" strongly prevails to normal operation relative to the "secondary energy." This is due to the fact that switch $T_1$ in the closed condition can substantially be regarded as a short circuit since the driver transistor $T_1$ is then substantially in saturation. Viewed from the secondary, substantially the short circuit is seen instead of the inductance $L_X$. However, the inductance $L_B$, the internal resistance of the base (B) -collector (C) diode $D_{c2}$ and the parallel arrangement of capacitor $C_y$ and coil $L_y$ are seen, as viewed from the primary. Therefore, when switch $T_1$ is closed it is only necessary to take the primary energy into account (in all these cases the internal resistances of the voltage sources $V_s$ and $V_H$ have been assumed to be substantially nil while also the leakage inductances of the transformer 1 have been ignored). Since conduction of transistor $T_1$ is controlled by the control signal 3 applied to its base, this means that the instants at which and the extent to which energy is supplied to the inductance $L_x$ are completely determined.

If, on the other hand, transistor $T_1$ does not become conductive because this transistor itself becomes defective or because there is something wrong in its control circuit, then the primarily supplied energy drops out and hence the control of the control circuit of the final transistor $T_2$ is lost.

In the latter case the secondary energy starts to play an uncontrolled part. This secondary energy is larger than the situation where the primary energy is actually supplied. In fact, as viewed from the secondary, a short circuit is not seen any longer, but the inductance $L_x$ is seen. The energy returned from the coil $L_y$ therefore accumulates in the inductances $L_x$ and $L_B$.

If collector current $I_{c2}$ and voltage $V_{ce2}$ of transistor $T_2$ are considered, the following appears. FIG. 4*a* shows the collector current $I_{c2}$ and FIG. 4b shows the collector voltage $V_{ce2}$ of the transistor $T_2$ if driver transistor $T_1$ functions satisfactorily. In FIG. 4c line 5 shows the collector current $I_{c2}$, line 6 shows the collector voltage $V_{ce2}$ and line 7 shows the current $I_{ly}$ flowing through the deflection coils $L_y$ if the transistor $T_1$ does not become conductive. Here the transistor $T_1$ is assumed to become defective after a satisfactory flyback period $0—t_1$ and subsequent control period $t_1—t_2$ as is shown in the left-hand part of FIG. 4c. If the transistor $T_1$ would become defective during the period $0—t_2$, the primary energy drops out somewhat earlier and the phenomenon is perhaps less pronounced but is not different in principle. Since the scan period is longer than the period $0—t_2$ the risk of defect during the scan period is greatest.

As the instant $t_4$ at which $T_1$ starts to conduct, under normal circumstances, the energy in the inductances $L_x$ and $L_B$ is not yet zero and therefore base current and thus collector current continue to flow in the final transistor $T_2$. This will result in a decrease of this residual energy after the instant $t_4$. However, since new energy is not supplied for the time being to inductances $L_x$ and $L_B$, the transistor $T_2$ cannot be bottomed for too long a period after the instant $t_4$ and it has been assumed that transistor $T_2$ comes out of a bottomed condition at the instant $t_5$. The collector current $I_{c2}$ will then remain at a slightly constant value for a short period $t_5—t_6$ and subsequently, during the period $t_6—t_7$, will decrease to zero. At the instant $t_7$ the energy in $L_x$ and $L_B$ is zero and hence the base current $I_{B2}$ and consequently the collector current $I_{c2}$ are likewise zero.

Energy is again accumulated in the deflection coil $L_y$ during the period $t_3—t_6$ and this energy will tend to start a free oscillation across capacitor $C_y$ when the collector current $I_{c2}$ is switched off during the period $t_6—t_7$. This oscillation current is indicated by line 7 in FIG. 4c. This actually means that energy is applied back to the inductances $L_x$ and $L_B$ at the end of the oscillation period through the then released base-collector diode $D_{c2}$ so that the energy accumulated in these inductances may again produce base-current $I_{B2}$ in the final transistor $T_2$. This means that the entire phenomenon as indicated in FIG. 4c is repeated, as often as is possible, depending upon the circuit losses. If these losses are small, however, this so-called self-oscillation may continue for a rather long time, the source $V_H$ actually functioning as a supplier of energy. Of course this self-oscillation might be eliminated by adding some attenuation in the secondary circuit. However, this attenuation would then be active under normal operating conditions too and would considerably reduce the efficiency of the circuit arrangement. Thus this latter solution is not considered because it is impractical.

If the collector voltage $V_{ce2}$ is considered, which occurs when driver transistor $T_1$ does not become conductive, the dissipation of final transistor $T_2$ appears to have increased considerably. This is apparent form FIG. 4c in which line 6 represents the collector voltage $V_{ce2}$. As long as the transistor $T_2$ is still bottomed, the collector voltage $V_{ce2}$ will deviate little from zero so that the product of current and voltage, which determine the natural dissipation of the transistor $T_2$, is still rather small. If, however, the transistor $T_2$ is no longer bottomed after the instant $t_5$, the collector voltage and hence the product of current and voltage rapidly increase. However, particularly due to the slow switching off during the period $t_6—t_7$ the natural dissipation of transistor $T_2$ increases considerably. This is particularly to be ascribed to the fact that the voltage $V_{ce2}$ increased considerably during this period and the current still has a substantial value over a large part of the latter period. Consequently, the development of heat in the final transistor $T_2$ will have disastrous results, especially if the phenomenon of self-oscillation continues over a few periods.

Figure 3:
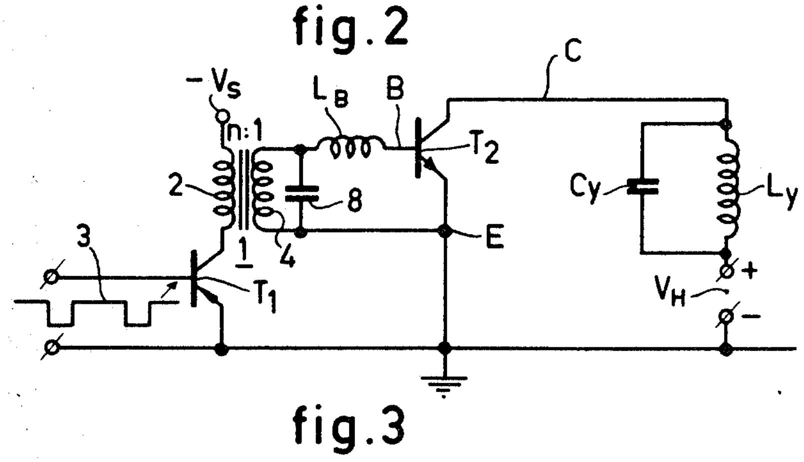
FIG. 3 shows the circuit arrangement according to the invention.

In order to prevent the self-oscillation a capacitor 8 of comparatively high value is connected parallel to the secondary 4 of the transformer 1, as is shown in FIG. 3. The capacitor 8 is also shown by a broken line in the substitution diagram of FIG. 2. The value of the capacitor 8 is chosen so that its impedance at the repetition frequency of the sawtooth current is small relative to the impedance of the secondary inductance $L_2$ of the transformer 1. A suitably chosen value provides an impedance for the capacitor 8 at the repetition frequency of the sawtooth current which is approximately 3 to 5 times smaller than the impedance of this secondary inductance $L_2$.

The fact that self-oscillation is then indeed avoided can be explained as follows. If, in fact, transistor $T_1$ is defective, the secondary circuit does not see the coupling inductance $L_x$, which is then actually formed by the secondary inductance $L_2$, but sees the parallel arrangement of said inductance $L_2$ and the capacitor 8. The portion of the current $I_{c2}$ which flows to the coupling inductance $L_x$ is then decreased to such an extent that the energy resupplied in this coupling inductance $L_x$ is too small to allow self-oscillation to occur. In other words, due to the additional connection of the capacitor 8 the apparent inductance which is present in the secondary circuit is smaller than the originally present inductance $L_x$. Since the coil $L_y$, which is the supplier of energy when the base-collector diode $D_{c2}$ conducts, can be considered a current source, the current flowing through the parallel arrangement of $L_x$ and $C_8$ remains the same, but the energy accumulated in the apparent inductance $L_{sch}$ is smaller than that which occurs in coil $L_x$ without the added connection of capacitor 8. ($\frac{1}{2}L_x I^2 c_2 > \frac{1}{2}L_{sch} I^2 c_2$, because $L_x$ 22 $L_{sch}$). The higher the value of the capacitor 8 the smaller the energy accumulated in the apparent inductance $L_{sch}$ and the smaller the risk of self-oscillation of the circuit arrangement. However, one cannot go too far in increasing the value of capacitor 8 since then the primary energy also will become too small at a given instant to render a satisfactory normal action of the circuit arrangement possible. Of course, it is possible to go quite far in increasing the value of capacitor 8 because the supply of the primary energy is a task of the driver transistor $T_1$. If, therefore, the value of capacitor 8 is increased, a higher collector current will flow during the periods that driver transistor $T_1$ conducts because there must always be sufficient energy in the coupling inductance $L_x$ to allow a sufficiently high base current $I_{B2}$ to flow in the final transistor $T_2$ after reblocking the driver transistor $T_1$. However, by choosing the transformation ration $n$ of the transformer 1 to be slightly larger it can still be achieved that even with a capacity 8 of comparatively high value, too high a collector current need not flow in the driver transistor $T_1$. In fact, primary 2 has $n$ times as many turns as the secondary 4 so that the secondary inductance $L_2$ appears in the primary circuit while being stepped up approximately $n^2$ times. The same applies to the capacitor 8 which, however, will be reflected in the primary circuit while being reduced $n^2$ times. The result is that this difference on the primary side is increased $n^2$ times if it is ensured that the impedance of the capacitor 8 is smaller than the impedance of the secondary inductance $L_2$. Thus if $n$ is chosen to be comparatively large, the required collector current of the driver transistor $T_1$ can also be considerably smaller than when a transformation ratio 1:1 is employed. If it is assumed that the peak-to-peak value of the switching signal between base and emitter of the transistor $T_2$ is approximately 7 volts and that the supply voltage $V_S$ of the driver transistor $T_1$ is approximately 130 volts, then a value of $n=20$ is obtained, so that $n^2$ becomes 400. Such a transformation ratio will therefore still ensure that the collector current of the driver transistor $T_1$ need not become much higher even when a capacitor 8 of comparatively high value is provided.

It has been assumed in the foregoing that the transformer 1 has substantially no leakage inductance. Even if leakage inductance is present, the provision of capacitor 8 would still add to the effect. In fact, in that case the secondary current $I_{c2}=I_{b2}$ first meets the capacitor 8 and therefore tends to start flowing through this capacitor and to a lesser extent through the series arrangement of leakage inductances and coupling inductance $L_x$. On the primary side, however, the primary current $I_{c1}$ first meets the coupling inductance $L_x$ and only thereafter does it meet the capacitor 8 through the secondary dispersion inductances. Therefore, the primary current in the coupling inductance $L_x$ is preferred to the secondary current which slightly simplifies the supply of primary energy under normal operating conditions relative to the case where no dispersion inductances are provided, and slightly hampers the supply of secondary energy if the driver transistor $T_1$ does not become conductive.

It is to be noted that the capacitor 8 must absolutely not shunt the series inductance $L_B$, too. In fact, as already stated $L_B$ serves to ensure that under normal operating conditions the collector current $I_{c2}$ of the final transistor $T_2$ returns as quickly as possible to zero at the end of the scan time. This function of $L_B$ must not be tampered with.

A few practical values of a circuit arrangement according to FIG. 3 are the following.

Transformation ratio $n$=20
Secondary inductance $L_2$=500 $\mu$H.
Series inductance $L_B$=22 $\mu$H.
Capacitor 8=470 k.p F.
Driver transistor $T_1$=Philips type B.C. 115.
Final transistor $T_2$=Philips type B.U. 105.
Capacitor $C_y$=2.4 k.p F.
Inductance $L_y$=2.1 H.
Supply voltage $V_S$=$V_H$=130 volts.

I claim:

1. A deflection circuit for producing a sawtooth current having a given flyback period on a deflection coil comprising, a unidirectional output transistor having an output circuit to which the deflection coil is connected, a driver transistor, a transformer coupling the output of the driver transistor to the base and emitter of the output transistor, a source of pulsatory switching signal coupled to the base of the driver transistor by means of which the driver transistor, via said transformer, supplies a switching signal that causes the output transformer to periodically turn on and off, the duration of the off period being longer than said given flyback period whereby a reverse current flows in said deflection coil and the base-collector junction of said output transistor at the start of the forward stroke of said sawtooth current, means for coupling a supply voltage to the output transistor that is at least 10 times the peak-to-peak voltage of the switching signal applied between the base and emitter of the output transistor, and a capacitor connected in shunt with the secondary winding of the transformer, said capacitor being chosen so that, at the repetition frequency of the sawtooth current, it has an impedance that is smaller than the impedance of the secondary inductance of said transformer.

2. A deflection circuit as claimed in claim 1 wherein the impedance of the capacitor at the repetition frequency of the sawtooth current is approximately 3 to 5 times smaller than the impedance of the secondary inductance of the transformer.

3. A deflection circuit as claimed in claim 1 wherein the primary winding of the transformer has approximately 20 times as many turns as the secondary winding.

4. A deflection circuit for producing a sawtooth current in a deflection coil comprising, a transistor having an output circuit connected to said deflection coil and an input circuit including inductive coupling means coupled to the transistor base and emitter electrodes, a source of pulsatory switching voltage coupled to said input circuit to periodically drive said transistor into a conductive state and a cutoff state, the duration of the cutoff period being longer than the sawtooth flyback period, a source of direct supply voltage coupled to said transistor and of a magnitude that is many times higher than the peak-to-peak amplitude of the switching voltage, and a capacitor connected in shunt with said inductive coupling means.

5. A deflection circuit as claimed in claim 4 wherein said inductive coupling means comprises a transformer having its primary winding coupled to the output of a driver transistor and a secondary winding coupled to the base and emitter of the output transistor and across which said capacitor is connected, the impedance of said capacitor, at the repetition frequency of the sawtooth current, being smaller than the impedance of said secondary winding.

6. A deflection circuit as claimed in claim 5 further comprising an inductor connected between said secondary winding and base electrode of the output transistor, and wherein said supply voltage is at least 10 times the value of the switching voltage.

7. A deflection circuit as claimed in claim 5 wherein the primary winding of the transformer has a greater number of turns than the secondary winding.

PO-1050
(5/69)

UNITED STATES PATENT OFFICE
CERTIFICATE OF CORRECTION

Patent No. 3,576,464 Dated April 27, 1971

Inventor(s) WILHELMUS THEODORUS HENDRIKUS HETTERSCHEID

It is certified that error appears in the above-identified patent and that said Letters Patent are hereby corrected as shown below:

IN THE CLAIMS

Col. 5, line 32, (Claim 1, line 9) change "transformer" to -- transistor --;

Col. 6, line 36, after "and" (1st occurrence) insert -- the --;

Signed and sealed this 2nd day of January 1973.

(SEAL)
Attest:

EDWARD M.FLETCHER,JR.
Attesting Officer

ROBERT GOTTSCHALK
Commissioner of Patent